United States Patent [19]
Taft

[11] 3,781,064
[45] Dec. 25, 1973

[54] BRAKE CONTROL APPARATUS

[75] Inventor: Philip Augustus Taft, Solihull, England

[73] Assignee: Girling Limited, South Yardley, Birmingham, England

[22] Filed: Aug. 6, 1971

[21] Appl. No.: 169,697

[30] Foreign Application Priority Data
Aug. 14, 1970 Great Britain.................. 39,209/70

[52] U.S. Cl............................. 303/21 F, 303/24 R
[51] Int. Cl.............................................. B60t 8/06
[58] Field of Search...................... 303/24 R, 24 BB, 303/21 CG, 21 F, 21 R; 188/181 A

[56] References Cited
UNITED STATES PATENTS
3,608,982  9/1971  Inada et al...................... 188/181 A
3,199,927  8/1965  Bidlack et al. .................... 303/21 F
3,542,167  11/1970  Wilson .............................. 303/21 R Primary Examiner—George E. A. Halvosa
Assistant Examiner—Edward R. Kazenske
Attorney—Imirie & Smiley

[57] ABSTRACT

Brake control apparatus for use in a braking system in which an input force from an input member is applied to brake applying means through a lever in the control apparatus, the lever controlling valves in a brake fluid circuit. A substantial proportion of the input force is absorbed by a spring and only the remaining portion of the input force acts on the lever to actuate the brakes. The apparatus includes deceleration sensing means adapted to apply a force to the lever in opposition to the input force. The opposition force is substantially proportional to the deceleration of a wheel controlled by the brake circuit, when the deceleration of the wheel exceeds a predetermined value.

7 Claims, 4 Drawing Figures

PATENTED DEC 25 1973
3,781,064
SHEET 3 OF 3
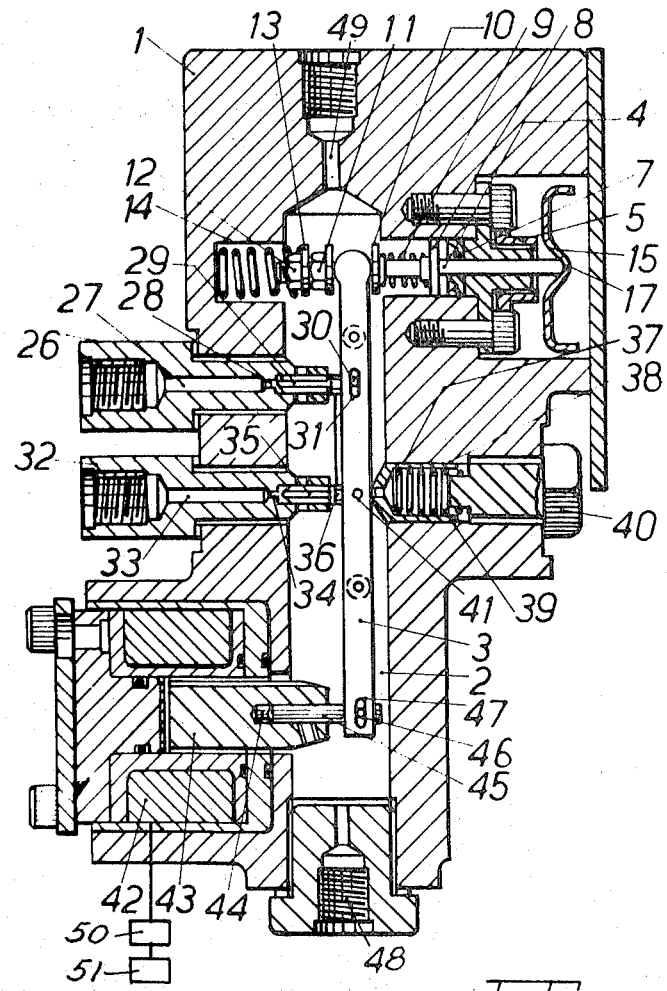
Fig-3-
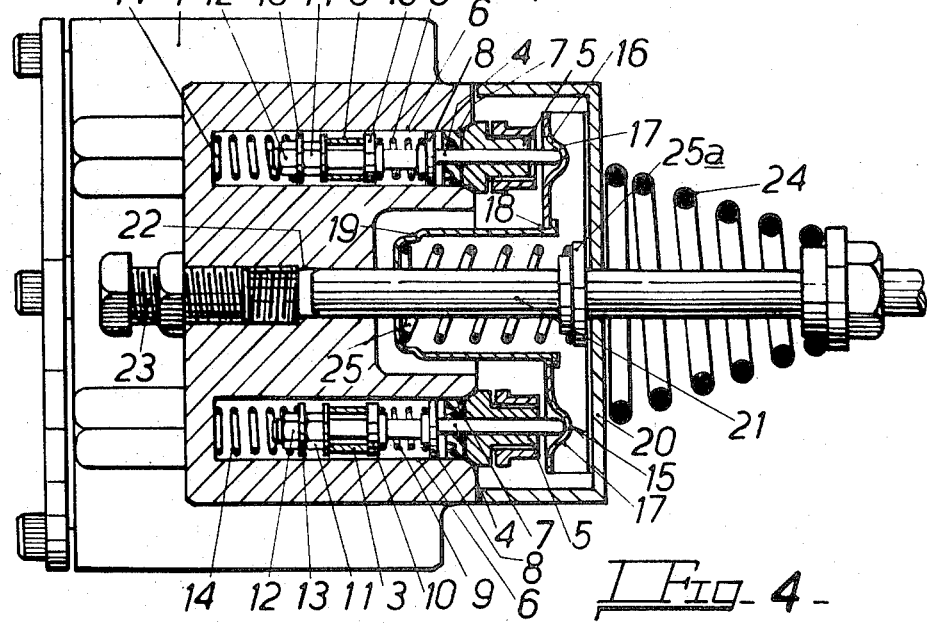
Fig-4-

BRAKE CONTROL APPARATUS

This invention relates to improvements in brake control apparatus for use in a braking system of the kind in which an input force from an input member is applied to brake applying means through a lever, and deceleration responsive means are adapted to apply to the lever in opposition to the input force a force substantially proportional to the deceleration of a wheel controlled by a brake circuit, when the deceleration of the braked wheel exceeds a predetermined value.

Hitherto, when brake control apparatus of the kind set foth is in use, a force is applied to the lever by the brake applying means in opposition to the input force to provide a reaction or "feel" on the input member, normally a pedal, in proportion to the magnitude of the brake application.

According to our invention in brake control apparatus of the kind set forth for a braking system the input force is applied to the lever through a compression spring which absorbs a substantial proportion of the input force, and the remaining proportion of the input force acts on the lever to actuate the brake applying means.

The brake control apparatus may be used to control the supply of high pressure hydraulic fluid from a high pressure source, conveniently an hydraulic accumulator or pump, to a wheel brake circuit. In such an arrangement the lever is located within a chamber in a housing connected to the brake circuit through a port in the wall of the housing. A first normally open valve controlling communication between the chamber and a reservoir for the high pressure source, and a second normally closed valve controlling communication between the high pressure source and the chamber, are coupled to the lever. When the lever is moved angularly with respect to the housing by the application of the input force, the first valve is closed, and the second valve is opened to allow high pressure fluid to flow from the high pressure source to the brake circuit through the chamber.

In operation the input force acts at one end of the lever to move the lever angularly through a first distance about its connection with the second valve thereby closing the first valve and, thereafter, further movement of the said one end of the lever in the same direction through a second distance causes the lever to pivot about its connection with the first valve, which is located between the said one end of the lever and the second valve, to open the second valve. Thus during the movement through the first distance the lever acts as a lever of the third order, and during its movement through the second distance the lever acts as a lever of the first order.

The deceleration responsive means acts on the end of the lever opposite to the said one end at a position outwardly from the connection between the lever and the second valve and in a direction opposite to the direction in which the input force is applied to the lever.

Preferably the deceleration responsive means comprises a solenoid-operated member which moves through a relatively short distance to move the lever angularly about its connection with the input member to close the second valve and open the first when the deceleration of the wheel controlled by the brake circuit exceeds a predetermined value.

One embodiment of our invention is illustrated in the accompanying drawings in which:

FIG. 3 is a section on the line 3—3 of FIG. 1; and

FIG. 4 is a section on the line 4—4 of FIG. 2.

Figure 1:
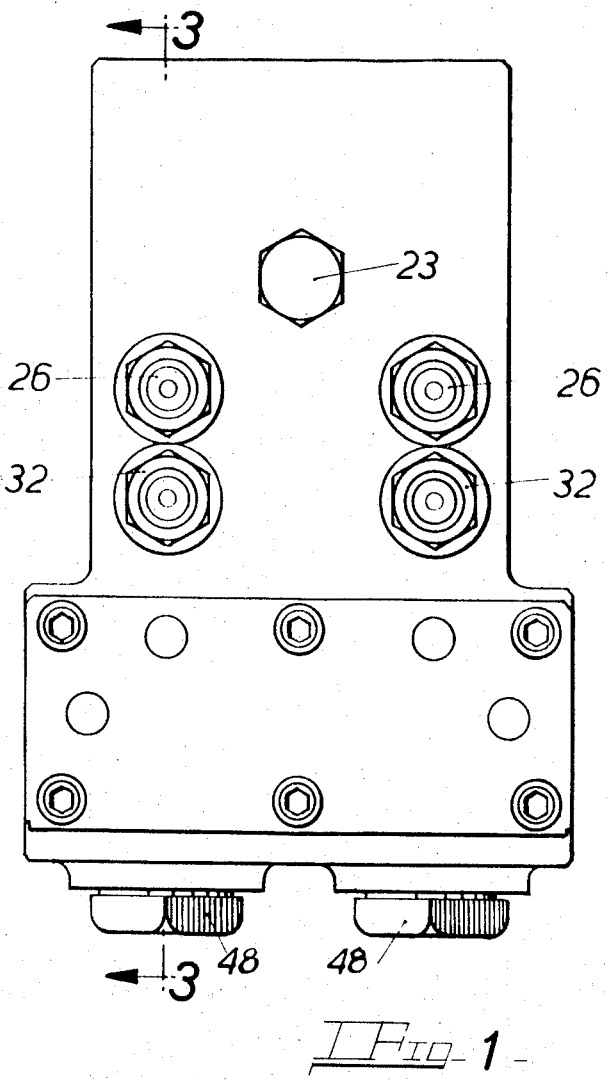
FIG. 1 is an end view of brake control apparatus, in the form of a unit for connection to separate braking circuits of an hydraulic braking system.
Figure 2:
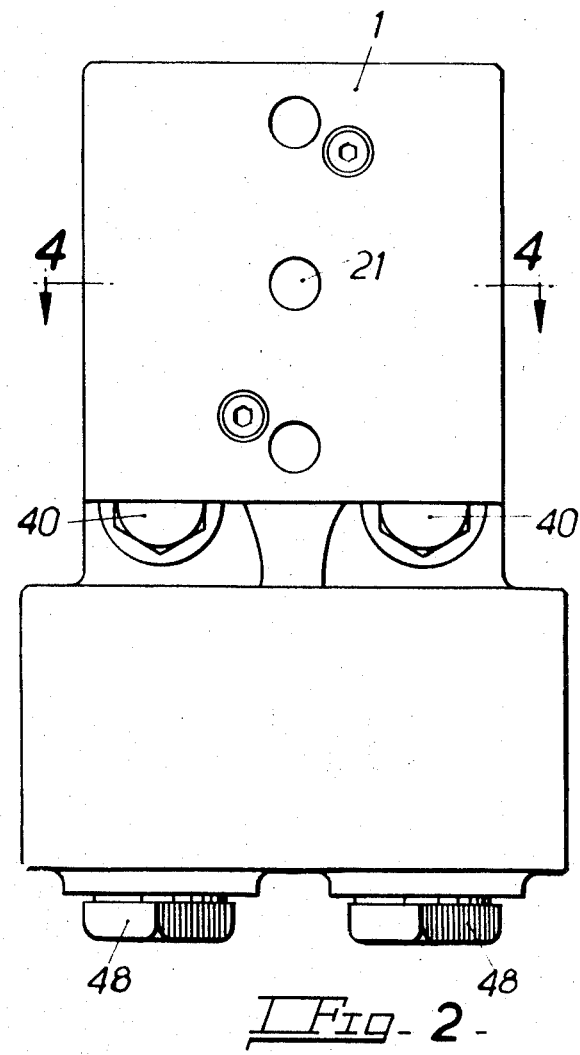
FIG. 2 is a view of the opposite end of the brake contro apparatus shown in FIG. 1.

In the brake control unit illustrated in the drawings 1 is a housing assembly including two longitudinally extending substantially closed chambers 2 which are separated from each other by a longitudinally extending partition (not shown). Each chamber 2 accommodates a longitudinally extending rigid non-resilient lever 3, and the levers 3 are located in spaced parallel side-by-side relationship in the chambers 2. The upper end of each lever 3 is enlarged and is fixed with a bore through which is inserted one end of a piston rod 4 working through a plug 5 which closes the outer end of a blind lateral passage 6 traversing the chamber 2 in which that lever is accommodated. The passages 6 are parallel with each other and a seal 7 at the inner end of each plug prevents hydraulic fluid leaking from the chambers 2 through the passages. Each piston rod 4 carries a piston 8 working in the portion of the passage on the outer side of the chamber 2, and a spring 9 abuts against the piston 8 to hold a collar 10 slidable on the piston rod 4 in engagement with the adjacent end of the lever 3. The end of the piston rod 4 which projects from the side of the lever 3 remote from the plug 5 is screw-threaded and carries a nut 11 engaging with an adjacent face of the lever 3. A lock nut 12 is screwed on to the free end of the piston rod 4, and a washer 13 interposed between the nuts 11 and 12 forms an abutment for one end of a compression return spring 14 engaging with the closed end of the passage 6.

A transversely extending balance bar 15 of channel section housed within a transverse recess in the housing assembly 1 is formed adjacent to the opposite ends of its web 16 with a pair of depressions 17 in which the outer ends of the piston rods 4 are received. The web of the bar 15 is formed at substantially the mid-point in its length with an opening 18 in which is fixedly secured the open end of a fitting 19 of thimble outline which projects into a recess continuous with the recess in which the balance bar is located. The recesses which accommodate the balance bar 15 and the thimble 19 are closed by means of a closure cap 20.

An input member in the form of a push-rod 21 extends through aligned openings in the cap 20 and the thimble 19 and, at its inner end, is guided in a through bore 22 in the housing and parallel with the passages 6. A screw 23 forming a stop for the inner end of the push-rod 21 is secured into the end of the bore 22 remote from the thimble.

The outer end of the push rod 21 is coupled to a brake-applying member, for example a pedal (not shown). A strong compression return spring 24 acts between an abutment collar on the push-rod 21 and the closure cap 20, and a similar compression spring 25 of lesser strength acts between the inner end of the thimble 19 and an abutment collar 25a on the push-rod 21 on the inboard side of the closure cap 20. In the inoperative position shown in the drawings the springs 24 and 25 hold the abutment collar in engagement with the inner face of the cap 20, and there is a substantial clearance between the inner end of the push-rod 21 and the stop screw 23.

The wall of the housing assembly 1 on the side of the chambers 2 remote from the balance beam 15 is provided with two aligned unions 26 for connection to a reservoir for supplying hydraulic fluid to a high pressure source, for example a pump. Each union 26 communicates with one of the chambers 2 and incorporates an axial bore 27 provided at an intermediate point in its length with an annular shoulder 28 of which the innermost radial face defines a seating for a first valve member 29 which works in the bore 27 and is of fluted or ribbed form for the whole of its axial length.

Each valve member 29 is coupled to its respective lever 3 by means of a transverse pin 30 which is fixed in the valve member 29 and received in an axial slot 31 in the lever 2.

A second pair of unions 32 are located in the wall of the housing 1 at positions below the unions 26. Each union 32 provides communication between a source of hydraulic fluid under pressure, for example the high pressure pump or an hydraulic accumulator supplied by the pump, and one of the chambers 2. Each union 32 incorporates an axial bore 33 provided at an intermediate point in its length with an annular shoulder 34 of which the innermost radial face defines a seating for the inner end of a second valve member 35 of fluted section which works in the bore 33. Each of the second valve members 35 is coupled through an extension 36 to the inner closed end of a valve spool 37 which works in a bore 38 in the wall of the housing 1 opposite to the union 32. A compression spring 39 acting between the closed inner end of the spool 37 and a threaded plug 40 secured into the outer end of the bore 38 normally holds its respective second valve member 35 in engagement with the seating 34 to cut off communication between the source of high pressure fluid and the chamber 2.

Each second valve member 35 is pivotally connected to a respective lever 3 at a point on the lever 3 spaced from its connection with the first valve 29 by a transverse pin 41 which is fixed in the extension 36.

Each lever 3 adjacent to its free end is coupled to means sensitive to deceleration of a braked wheel.

As illustrated each deceleration sensitive means comprises a solenoid coil 42 located in a recess in the wall of the housing incorporating the unions 26 and 32. Each solenoid coil 42 surrounds a magnetic core-piece 43 which, at its inner end, projects into a respective chamber 2 and is provided in its inner end with a bore 44 in which is clamped a rod 45. The rod 45 is coupled to one lever 3 by means of a pin 46 in the rod 45 which is received in an axial slot 47 in the lever 3.

When installed in a braking system each chamber 2 of the unit is connected to the wheel brakes of separate brake circuits, through outlet connections 48 and 49, and the solenoids 42 are connected to amplifier means 50 for amplifying electrical signals produced by sensor means 51 which sense the deceleration of the wheels controlled by the brakes of the separate circuits.

In the inoperative position the valve members 35 are urged into engagement with the seating 34 by means of the springs 39 and the return springs 14 25 and 24 hold the levers 3 in retracted positions in which the first valve members 29 are held away from their seatings 28. Thus the chambers 2 are both in communication with the reservoir for the high pressure source.

In the normal operation of the brake, depression of the brake pedal advances the push rod 21 in the bore 22 against the force of the compression springs 24 and 25. A substantial proportion of the load applied to the pedal is taken in compressing the spring 24 and the rate of the spring 24 is chosen to give satisfactory pedal feel characteristics. The remainder of the load is used in compressing the spring 25 so that, at the termination of the advance movement of the push rod 21, the spring 25 applies to the balance beam 15 a force sufficient to advance the pistons 8 and piston rods 4 axially and simultaneously in the passages 6 to actuate the valve members 29 and 35 in a manner and sequence to be described hereinafter. At the termination of the advance movement of the push rod 21, the rod engages with the screw 23 which forms a stop preventing the system from being overloaded.

As the balance beam advances the pistons 8 and piston rods 4, the return springs 14 are compressed, and the levers 3 are moved angularly in a counterclockwise direction with reference to FIG. 3 about the pivotal connections with the extensions 36 as fulcrums. The levers thus act as levers of the third order. This angular movement of the levers 3 cause the first valve members 29 to engage with their seatings 28 and cut off communication between the reservoir and the chambers 2, through the passages 27. After the valve members 29 have engaged with the seatings 28 further angular movement of the levers 3 in the same direction cause the levers to move angularly about the pivotal connections with the valve members 29 as fulcrums and move the second valve members 35 away from the seatings 34 against the force of the springs 39. The levers thus act as levers of the first order. Hydraulic fluid under pressure is then admitted into the chambers 2 through the passage 33 in the unions 32 and is delivered to the separate brake circuits through the outlet connections, 48.

The high pressure fluid in the chambers 2 acts on the pistons 8 to apply to the rods 4 forces in direction opposing the input forces from the balance bar 15. With the assistance of the forces in the return springs 14 the pistons 8 and the balance bar 15 move in the opposite direction into a neutral position against the force of the compression spring 25. This permits the valve members 35 to engage with their seatings 34 and cut out the supply of high pressure fluid into the chambers 2. The push-rod 21 remains in the advanced position and the reaction of the high pressure fluid on the pistons 8 is not transmitted to the brake pedal.

When the deceleration of a braked wheel of one of the brake circuits exceeds a predetermined value, the corresponding solenoid 42 is energised to retract the magnetic core piece 43 and draw that end of the lever coupled to that core piece 43 through the rod 45 towards the solenoid. This causes the lever to act as lever of the first order and fulcrum about its pivotal connection with the extension 36 of the valve member 35. The upper end of the lever 3 moves towards the balance bar 15 sliding the collar 10 along the piston rod 4 against the force in the compression spring 9, which is compressed. Simultaneously the first valve member 29 is moved away from its seating 28 to permit high pressure fluid supplied to the brake of that braking circuit to be relieved and returned to the reservoir through the chamber 2.

The pressure in the chamber 2 which was previously acting on the piston 8 is thus relieved so that the piston 8 and the piston rod 4 advances automatically into its original advanced position and the balance bar tilts about its engagements with the outer ends of the piston rods 4.

When the deceleration of the braked wheel drops below the said predetermined value the solenoid is de-energised and the force in the spring 9 urges that end of the lever 3 axially to move the lever 3 angularly in a direction to urge the valve member 29 against its seating 28 and urge the valve member 35 away from its seating 34 as dewcribed above. Thereafter the operation of the appratus is repeated as described above.

The sequence of relieving the braking pressure when the deceleration of a braked wheel exceeds a predetermined value as described above, may take place independently, simultaneously or sequentially for each of the separate brake circuits supplied from the separate chambers when the deceleration of a wheel or wheels of the separate circuits exceeds the said predetermined values.

The sizes of the valves 29 and 35 are chosen so that strokes of the pistons 8 and the loads applied thereto are small. Variation in the load in the spring 25 due to changes in the axial positions of the pistons 8 is very small and represent only a small proportion of the total load applied to the push-rod 21. Thus such variations in the load of the spring 25 will not be felt by the driver of the vehicle when depressing the brake pedal.

Our invention has the advantage that one unit controls simultaneously the braking characteristics of two separate braking circuits. Normal pedal reaction or "feel" is obtained on each and every brake application and, under conditions in which the braking effort applied to a wheel is relieved, such relief of braking effort is not translated to the driver.

The provision of the strong spring 24 enables the rate of that spring to be chosen to meet the requirements of any particular driver.

The provision of solenoid operated deceleration sensing means enables advantage to be taken of a minimum energy requirement and this in turn, enables the solenoid to be designed to give minimum inductive delay and maximum response. Furthermore the short travel requirement of the solenoid 42 required to effect relief of the braking pressure enables the solenoid to be designed with low hysteresis characteristics.

The arrangements of the pistons 8 and the valve members obviate the necessity for providing superfine finishes on hydraulic bores, thereby reducing the cost of a unit to a minimum.

I claim:

1. Brake control apparatus for a vehicle braking system incorporating a fluid brake circuit, said apparatus comprising a housing in which there is a chamber, a port in said housing communicating with said chamber and being adapted for connection to said brake circuit, a first normally open valve for controlling fluid flow between said chamber and a fluid reservoir, a second normally closed valve for controlling fluid flow between said chamber and a high pressure source, a lever pivotally mounted in said chamber, angular movement of said lever relative to said housing causing said first valve to close and subsequently said second valve to open whereby high pressure fluid from the high pressure source can flow through said chamber and through said port to said brake circuit, a first spring, a pedal-operated input member operative to apply an input force to said lever through said first spring to cause angular movement of the lever, a second spring operative to absorb a substantial proportion of the pedal-loading on the input member whereby said input force is only a minor proportion of the pedal-loading, and means responsive to the deceleration of a braked wheel operative to apply to said lever a force in opposition to said input force when the deceleration of the wheel exceeds a predetermined value.

2. A brake control appratus as claimed in claim 1 wherein said deceleration responsive means comprises a solenoid operated member which in operation is movable through a relatively short distance to move said lever angularly in a direction to close said second valve and subsequently open said first valve when the deceleration of the wheel controlled by said brake circuit exceeds said predetermined value.

3. A brake control apparatus as claimed in claim 1, comprising a housing in which there are two separate sealed chambers, a pair of levers one pivotally mounted and located in each of said chambers, a pair of input rods one connected to each of said levers, a balance beam operative to act on both of said input rods, the first spring operative to transmit an input force to said balance beam and thence to said input rods and said levers to operate first and second valves associated with each chamber.

4. A brake control apparatus as claimed in claim 3 wherein each of said chambers is in communication with a separate brake circuit.

5. A brake control apparatus as claimed in claim 1 wherein there is a mechanical connection between said lever and said first valve, a mechanical connection between said lever and said second valve, and said input force acts at one end of said lever causing said lever to move angularly through a first distance about said mechanical connection with said second valve thereby closing said first valve, and, thereafter, further movement of said lever in the same direction through a second distance causing said lever to pivot about said mechanical connection with said first valve thereby opening said second valve.

6. A brake control apparatus as claimed in claim 5 wherein said first valve is located between said one end of said lever and said second valve, said lever acting as a lever of the third order during its movement through said first distance, and acting as a lever of the first order during its movement through said second distance.

7. A brake control apparatus as claimed in claim 5 wherein said deceleration responsive means acts on the end of said lever opposite to said one end in a direction opposite to the direction of the input force applied to said lever.

* * * * *